(12) United States Patent
Lee et al.

(10) Patent No.: US 7,665,953 B2
(45) Date of Patent: Feb. 23, 2010

(54) METHODS AND SYSTEM FOR RECUPERATED COOLING OF INTEGRAL TURBINE NOZZLE AND SHROUD ASSEMBLIES

(75) Inventors: Ching-Pang Lee, Cincinnati, OH (US); Eric Alan Estill, Morrow, OH (US); James Harvey Laflen, Loveland, OH (US); Katherine Jaynetorrence Andersen, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 560 days.

(21) Appl. No.: 11/565,176

(22) Filed: Nov. 30, 2006

(65) Prior Publication Data

US 2008/0131259 A1    Jun. 5, 2008

(51) Int. Cl.
*F01D 25/12* (2006.01)
(52) U.S. Cl. .................... 415/1; 415/115; 415/173.1; 415/199.5
(58) Field of Classification Search ................. 415/115, 415/173.1, 199.5, 1
See application file for complete search history.

(56) References Cited

U.S. PATENT DOCUMENTS

| | | | |
|---|---|---|---|
| 4,949,545 A | 8/1990 | Shekleton | |
| 5,217,348 A | 6/1993 | Rup, Jr. et al. | |
| 5,511,945 A | 4/1996 | Glezer et al. | |
| 6,126,389 A * | 10/2000 | Burdgick | 415/115 |
| 6,139,257 A * | 10/2000 | Proctor et al. | 415/115 |
| 6,340,285 B1 | 1/2002 | Gonyou et al. | |
| 6,354,795 B1 | 3/2002 | White et al. | |
| 6,398,488 B1 | 6/2002 | Solda et al. | |
| 6,431,820 B1 | 8/2002 | Beacock et al. | |
| 6,431,832 B1 | 8/2002 | Glezer et al. | |
| 6,485,255 B1 | 11/2002 | Care et al. | |
| 6,779,597 B2 | 8/2004 | DeMarche et al. | |
| 6,984,100 B2 | 1/2006 | Bunker et al. | |
| 7,033,138 B2 * | 4/2006 | Tomita et al. | 415/139 |
| 7,306,424 B2 * | 12/2007 | Romanov et al. | 415/115 |

\* cited by examiner

*Primary Examiner*—Ninh H Nguyen
(74) *Attorney, Agent, or Firm*—William Scott Andes, Esq.; Armstrong Teasdale LLP (57) ABSTRACT

A method for cooling a shroud segment of a gas turbine engine is provided. The method includes providing a turbine shroud assembly including a shroud segment having an inner surface and a leading edge that is substantially perpendicular to the inner surface, and coupling a turbine nozzle to the turbine shroud segment such that a gap is defined between an aft edge of an outer band of the turbine nozzle and the leading edge. The method also includes directing cooling air into the gap, and directing the cooling air in the gap through at least one cooling hole extending between the leading edge and the inner surface.

17 Claims, 4 Drawing Sheets

METHODS AND SYSTEM FOR RECUPERATED COOLING OF INTEGRAL TURBINE NOZZLE AND SHROUD ASSEMBLIES

STATEMENT REGARDING FEDERALLY SPONSORED RESEARCH & DEVELOPMENT

The U.S. Government may have certain rights in this invention pursuant to contract number N00019-04-C-0093.

BACKGROUND OF THE INVENTION

This invention relates generally to gas turbine engines and, more particularly, to methods and systems for cooling integral turbine nozzle and shroud assemblies.

One known approach to increase the efficiency of gas turbine engines requires raising the turbine operating temperature. However, as operating temperatures are increased, the thermal limits of certain engine components may be exceeded, resulting in reduced service life and/or material failure. Moreover, the increased thermal expansion and contraction of components may adversely affect component clearances and/or component interfitting relationships. Consequently, conventional cooling systems have been incorporated into gas turbine engines to facilitate cooling such components to avoid potentially damaging consequences when exposed to elevated operating temperatures.

It is known to extract, from the main airstream, air from the compressor for cooling purposes. To facilitate maintaining engine operating efficiency, the volume of cooling air extracted is typically limited to a small percentage of the total main airstream. As such, this requires that the cooling air be utilized with the utmost efficiency in order to facilitate maintaining the temperatures of components within safe limits.

For example, one component that is subjected to high temperatures is the shroud assembly located immediately downstream of the high pressure turbine nozzle extending from the combustor. The shroud assembly extends circumferentially about the rotor of the high pressure turbine and thus defines a portion of the outer boundary (flow path) of the main gas stream flowing through the high pressure turbine. Gas turbine engine efficiency may be negatively affected by a fluctuation in turbine blade clearance measured between a radially outer surface of the turbine blade and a radially inner surface of the shroud assembly. During transient engine operation, turbine blade clearance is a function of a difference in radial displacement of the turbine rotor blade and the shroud assembly. The turbine rotor typically has a larger mass than the stationary shroud system and, thus, during turbine operation, the turbine rotor typically has a slower thermal response than the shroud assembly. When the difference in the rotor blade radial displacement and the shroud assembly radial displacement is too great, the blade clearance is increased, which may result in reducing engine efficiency.

Moreoever, during engine operation, a gap may be defined between a trailing edge of the high pressure turbine nozzle outer band and a leading edge of the adjacent shroud segment. Cooling air, including, without limitation, nozzle leakage and/or purge flow, enters the gap and flows into the main gas stream channeled through the high pressure turbine. More specifically, because known nozzle outer band trailing edges and shroud leading edges have a simple 90° corner, the gap opens directly into the main gas stream. During engine operation, as the main gas stream flows through the nozzle vanes, a circumferential gas pressure variation may be created downstream from the vane trailing edge. This circumferential gas pressure variation may cause localized hot gas ingestion into the gap between the outer band and the shroud segment. As a result, cooling air flowing through the gap may not effectively cool the downstream shroud segment.

BRIEF DESCRIPTION OF THE INVENTION

In one aspect, a method for cooling a shroud segment of a gas turbine engine is provided. The method includes providing a turbine shroud assembly including a shroud segment having an inner surface and a leading edge that is substantially perpendicular to the inner surface, and coupling a turbine nozzle to the turbine shroud segment such that a gap is defined between an aft edge of an outer band of the turbine nozzle and the leading edge. The method also includes directing cooling air into the gap, and directing the cooling air in the gap through at least one cooling hole extending between the leading edge and the inner surface.

In a further aspect, a turbine nozzle and shroud assembly for a gas turbine engine is provided. The turbine nozzle and shroud assembly include a shroud segment including a leading edge and an inner surface that is substantially perpendicular to the leading edge, and a turbine nozzle including an outer band having an aft edge. The turbine nozzle is upstream from the shroud segment and coupled with the shroud segment such that a gap is defined between the aft edge and the leading edge. The shroud segment includes at least one cooling hole extending between the leading edge and the inner surface. The at least one cooling hole is configured to direct cooling air in the gap toward the hot gas flow path.

In another aspect, a cooling system for a gas turbine engine is provided. The gas turbine engine includes a shroud segment having a leading edge and an inner surface that is substantially perpendicular to the leading edge, and a turbine nozzle including an outer band having an aft edge. The turbine nozzle is positioned upstream of the shroud segment and is coupled to the shroud segment such that a gap is defined between the aft edge and the leading edge. The cooling system includes at least one cooling hole formed between the leading edge and the inner surface. The cooling system is configured to direct cooling air in the gap toward a hot gas flow path defined within the gas turbine engine.

DETAILED DESCRIPTION OF THE INVENTION

The present invention provides a turbine shroud cooling system for film cooling a shroud segment. The turbine shroud cooling system facilitates forming a barrier between the hot gas flow path flowing through the high pressure turbine and cooling air flowing through a gap defined between the turbine nozzle and the shroud segment. More specifically, an extended lip at a trailing edge of the outer band facilitates forming the barrier between the hot gas flow path and the gap defined between an outer band of the turbine nozzle and the shroud segment. Further, the extended lip facilitates pressurizing the gap to facilitate preventing or limiting hot gas injection into the gap. In one embodiment, the extended lip forms an axial aft facing film cooling slot in parallel with a rounded corner portion of the shroud leading edge to facilitate film cooling the downstream shroud segment.

Although the present invention is described below in reference to its application in connection with cooling a shroud assembly of an aircraft gas turbine, it should be apparent to those skilled in the art and guided by the teachings herein provided that with appropriate modification, the cooling system or assembly of the present invention can also be suitable to facilitate cooling other turbine engine components, such as, but not limited to, the nozzle and/or vane sections.

Figure 1:
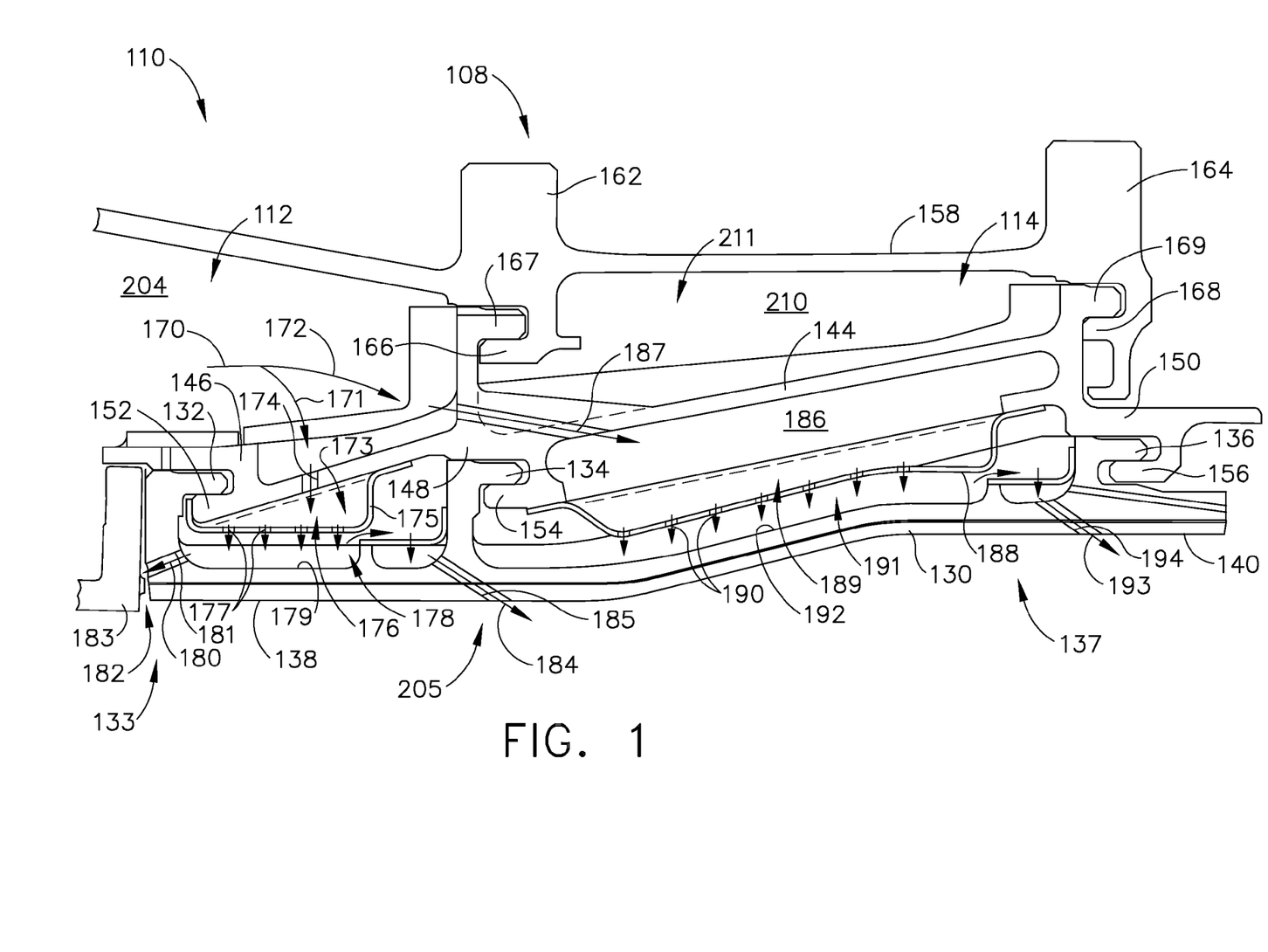
FIG. 1 is a side view of an exemplary shroud assembly schematically illustrating high pressure cooling air flow through the shroud assembly.
Figure 2:
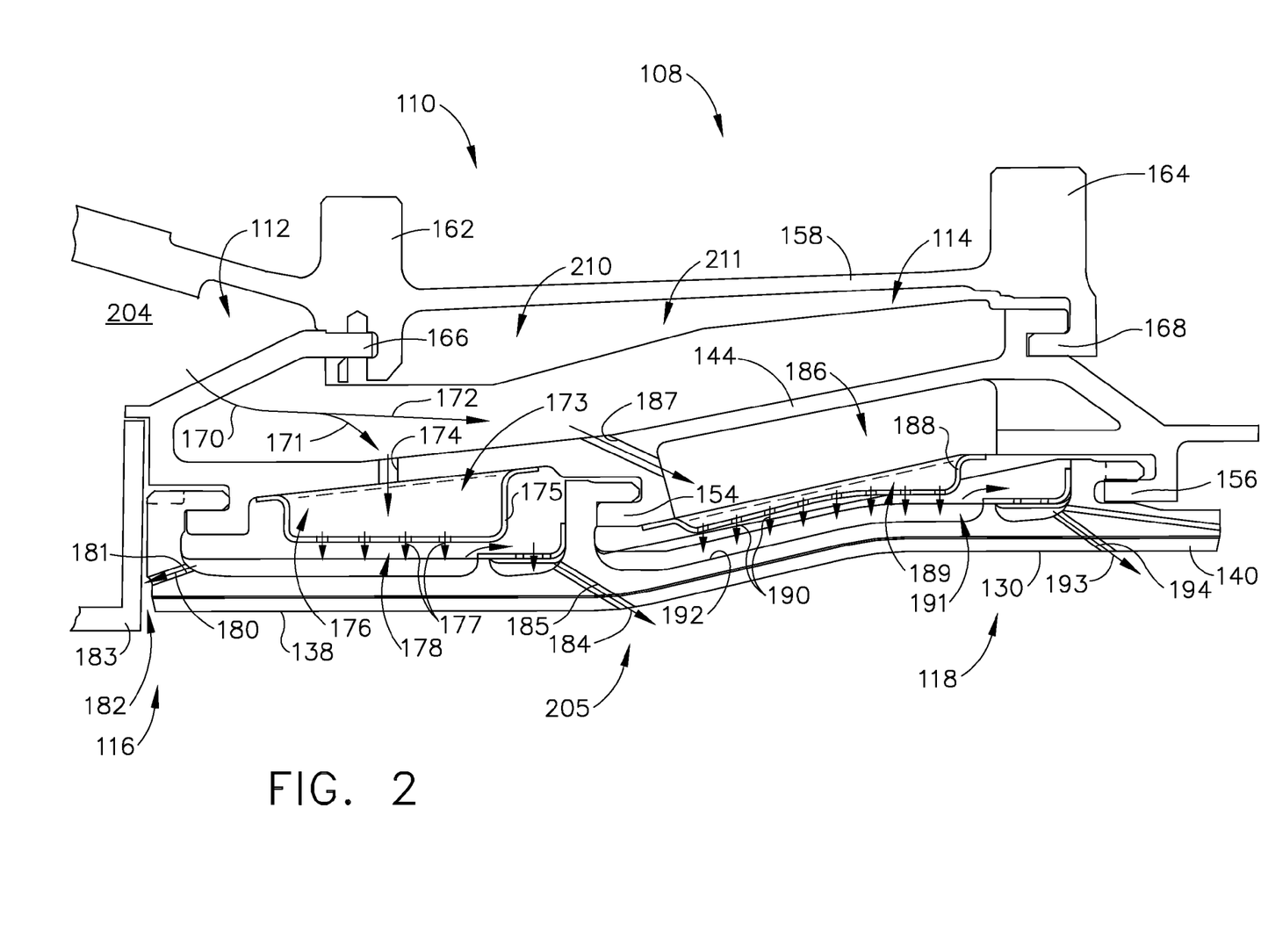
FIG. 2 is a side view of an alternative shroud assembly schematically illustrating high pressure cooling air flow through the shroud assembly.

FIG. 1 is a side view of an exemplary shroud assembly schematically illustrating high pressure cooling air flow through the shroud assembly. FIG. 2 is a side view of an alternative shroud assembly schematically illustrating high pressure cooling air flow through the shroud assembly. To facilitate controlling shroud assembly thermal response and/or shroud assembly displacement during transient engine operation, in the exemplary embodiment, a turbine engine cooling assembly 108 includes a shroud assembly, generally indicated as 110, for a high pressure turbine section 112 and a low pressure turbine section 114 of a gas turbine engine. It should be apparent to those skilled in the art and guided by the teachings herein provided that turbine engine cooling assembly 108 may be suitable to facilitate cooling other sections of the gas turbine engine, such as, but not limited to, a nozzle section and/or a vane section.

Shroud assembly 110 includes turbine engine cooling components in the form of shroud segments 130. Each shroud segment 130 includes a forward mounting hook 132 at a circumferential leading edge 133 of shroud segment 130. Shroud segment 130 also includes a midsection mounting hook 134 and an aft mounting hook 136 adjacent to a circumferential trailing edge 137 of shroud segment 130.

A plurality of shroud segments 130 are arranged circumferentially in a generally known fashion to form an annular segmented shroud. Shroud segments 130 define an annular clearance between high pressure turbine blades (not shown) and a radially inner surface 138 of a high pressure turbine section of shroud segments 130, and between low pressure turbine blades (not shown) and a radially inner surface 140 of a low pressure turbine section of shroud segment 130. A plurality of segmented shroud supports 144 interconnect shroud segments 130. Each shroud support 144 circumferentially spans and supports adjacent shroud segments 130. In alternative embodiments, shroud supports 144 are modified to support any suitable number of shroud segments 130 less than or greater than two shroud segments 130. In the exemplary embodiment, shroud assembly 110 includes twenty-six (26) shroud segments 130 and thirteen (13) shroud supports 144, although any suitable number of shroud segments 130 and/or shroud supports 144 may be utilized in alternative embodiments.

Each shroud support 144 includes a forward section 146, a midsection 148 and an aft section 150 that form respective forwardly projecting hangers 152, 154 and 156. Mounting hooks 132, 134 and 136 are received by cooperating hangers 152, 154 and 156, respectively, in tongue-in-groove, or hook-in-hanger, interconnections such that shroud support 144 supports respective shroud segments 130.

Shroud assembly 110 includes an annular shroud ring structure 158 that supports shroud supports 144. In one embodiment, shroud ring structure 158 is a one-piece, continuous annular shroud ring structure. A radial position of each shroud support 144, as well as of each shroud segment 130, is closely controlled by only two annular position control rings 162 and 164 formed on shroud ring structure 158. In contrast to conventional shroud ring structures, to facilitate reducing or limiting a weight of shroud assembly 110, shroud ring structure 158 includes only two position control rings 162 and 164. A midsection position control ring 162 includes an axially forwardly projecting hanger 166 that receives and/or cooperates with a rearwardly projecting mounting hook 167 formed by support structure midsection 148 in a first circumferential tongue-in-groove or hook-in-hanger interconnection. An aft position control ring 164 includes an axially forwardly projecting hanger 168 that receives and/or cooperates with a rearwardly projecting mounting hook 169 of support structure aft section 150 in second circumferential tongue-in-groove or hook-in-hanger interconnection.

In the exemplary embodiment, hangers 166 and/or 168 are in direct axial alignment, i.e., aligned generally in the same radial plane, with respective hanger 154 and hanger 156 to facilitate maximizing the radial support and/or radial position control provided to shroud support 144 and, thus, corresponding shroud segments 130. This alignment orientation facilitates increasing the rigidity of the entire shroud support assembly. In an alternative embodiment, shown in FIG. 2, hanger 166 and/or hanger 168 are in an offset axial alignment, i.e., not aligned generally in the same radial plane, with respective hanger 154 and hanger 156. In the exemplary embodiment, shroud ring structure 158 is bolted to the combustor case (not shown) at an aft end of shroud ring structure 158. Shroud ring structure 158 is cantilevered away from leading edge 133 at the combustor case interface. As such, midsection position control ring 162 is positioned several inches away from the combustor aft flange (not shown), and is thereby divorced from any non-uniform circumferential variations in radial deflection in the combustor case.

In the exemplary embodiment, high pressure cooling air 170 is extracted from a compressor (not shown) positioned upstream of shroud assembly 110. A first portion 171 of high pressure cooling air 170 extracted from the compressor facilitates cooling high pressure turbine section 112. A second portion 172 of high pressure cooling air 170 extracted from the compressor facilitates cooling low pressure turbine section 114. Referring further to FIG. 1, directional arrows corresponding to first portion 171 and second portion 172 illustrate at least a portion of a flow path of first portion 171 of high pressure cooling air 170 through a high pressure turbine section active convection cooling zone 173 and second portion 172 of high pressure cooling air 170 through a low pressure turbine section active convection cooling zone 186 (described below), respectively.

In this embodiment, first portion 171 of high pressure cooling air 170 is metered into a first or high pressure turbine section active convection cooling zone 173. More specifically, first portion 171 of high pressure cooling air 170 is metered through at least one high pressure turbine section (HPTS) feed hole 174 defined in shroud support 144. First portion 171 of high pressure cooling air 170 impinges against a pan-shaped HPTS impingement baffle 175 positioned within high pressure turbine section active convection cooling zone 173. Baffle 175 is coupled to shroud support 144 and thus at least partially defines an upper HPTS cavity or plenum 176. First portion 171 of high pressure cooling air 170 is then metered through a plurality of perforations 177 formed in impingement baffle 175 as cooling air into a lower HPTS cavity or plenum 178 defined in shroud segment 130, wherein the cooling air impinges against a backside 179 of shroud segment 130. A portion, such as spent impingement cooling air 180, of high pressure cooling air exits plenum 178 through a plurality of forwardly directed cooling openings 181 defined at, or near, shroud segment leading edge 133 configured to facilitate purging a gap 182 defined between high pressure turbine nozzle outer band 183 and leading edge 133. A portion 184 of high pressure cooling air is metered through a plurality of rearwardly directed cooling openings 185 defined in shroud segment 130 to facilitate film cooling inner surface 138 and/or 140. Spent impingement cooling air 180 of high pressure cooling air exiting cooling openings 181 facilitates preventing or limiting hot gas injection or recirculation into shroud assembly 110 at leading edge 133.

Second portion 172 of high pressure cooling air 170 extracted from the compressor facilitates cooling low pressure turbine section 114. In this embodiment, second portion 172 of high pressure cooling air 170 is metered into a second or low pressure turbine section active convection cooling zone 186. More specifically, second portion 172 of high pressure cooling air 170 is metered through at least one low pressure turbine feed hole 187 defined in shroud support 144. Second portion 172 of high pressure cooling air 170 impinges against a pan-shaped low pressure turbine section (LPTS) impingement baffle 188 positioned within low pressure turbine section active convection cooling zone 186. Baffle 188 is coupled to shroud support 144, and thus at least partially defines an upper LPTS cavity or plenum 189. Second portion 172 of high pressure cooling air 170 is then metered through perforations 190 defined in impingement baffle 188 and into a lower LPTS cavity or plenum 191 wherein high pressure cooling air impinges against a backside 192 of shroud segment 130. Cooling air 193 exits plenum 191 through a plurality of rearwardly directed cooling openings 194 defined through shroud segment 130, to facilitate film cooling radially inner surface 140 of trailing edge 137 of shroud segment 130 downstream.

As shown in FIG. 1, high pressure cooling air 170 is initially directed into a duct 204 defined at least partially between high pressure turbine nozzle outer band 183 and the portion of shroud ring structure 158 forming midsection position control ring 162. High pressure cooling air 170 is separated within duct 204 into first portion 171, and into second portion 172, as high pressure cooling air 170 is directed through duct 204. First portion 171 of high pressure cooling air 170 is metered through HPTS feed holes 174 into active convection cooling zone 173 and into plenum 178 to facilitate impingement cooling in high pressure turbine section 112. Spent impingement cooling air 180 exits shroud segment 130 through shroud segment leading edge cooling openings 181 to facilitate purging gap 182 defined between high pressure turbine nozzle outer band 183 and shroud segment 130, and/or through cooling openings 185 defined at a trailing end 205 of high pressure turbine section 112 to facilitate film cooling inner surface 138 and/or 140 of shroud segment 130.

Second portion 172 of high pressure cooling air 170 is directed into second active convection cooling zone 186 that is defined at least partially between shroud support 144 and shroud segment 130, and between midsection position control ring 162 and aft position control ring 164. Second portion 172 of high pressure cooling air 170 facilitates cooling low pressure turbine section 114. In one embodiment, second portion 172 of high pressure cooling air 170 is metered through a plurality of low pressure turbine feed holes 187 defined in shroud support 144. More specifically, second portion 172 of high pressure cooling air 170 is metered directly into active convection cooling zone 186 to facilitate shroud segment impingement cooling in low pressure turbine section 114, such that cooling air bypasses a third region 210 defining an inactive convection cooling zone 211 between shroud support 144 and shroud ring structure 158, and between midsection position control ring 162 and aft position control ring 164. Spent impingement cooling air exits shroud segment 130 through cooling openings 194 defined at or near trailing edge 137 of shroud segment 130.

In the flow path illustrated in FIG. 1, high pressure turbine section active convection cooling zone 173 and/or low pressure turbine section active convection cooling zone 186 are directly and actively cooled. Low pressure turbine section inactive convection cooling zone 211 is inactive, i.e., no high pressure cooling air flows through inactive convection cooling zone 211. Thus, a thermal response within inactive convection cooling zone 211 to environmental conditions created during transient engine operation is reduced and/or retarded. As a result, transient displacement of midsection position control ring 162 and/or aft position control ring 164 is also reduced and/or retarded.

As shown in FIG. 2, high pressure cooling air 170 is directed into duct 204 defined at least partially between high pressure turbine nozzle outer band 183 and shroud ring structure 158 forming midsection position control ring 162. High pressure cooling air 170 is separated into first portion 171 and second portion 172. First portion 171 of high pressure cooling air 170 is metered through HPTS feed hole(s) 174 into high pressure turbine section active convection cooling zone 173 at least partially defining plenum 176 and plenum 178 to facilitate shroud segment impingement cooling in high pressure turbine section 112. Spent impingement cooling air 180 exits shroud segment 130 through shroud segment leading edge cooling openings 181 to facilitate purging gap 182 between high pressure turbine nozzle outer band 183 and shroud segment 130 and/or through cooling openings 185 defined at trailing end 205 of high pressure turbine section 112 to facilitate film cooling inner surface 138 and/or 140.

Second portion 172 of high pressure cooling air 170 is directed into low pressure turbine section active convection cooling zone 186 defined at least partially between shroud support 144 and shroud segment 130, and between midsection position control ring 162 and aft position control ring 164 to facilitate cooling low pressure turbine section 114. In one embodiment, second portion 172 of high pressure cooling air 170 is metered through a plurality of low pressure turbine feed holes 187 defined through shroud support 144. Second portion 172 of high pressure cooling air 170 is metered directly into low pressure turbine section active convection cooling zone 186 at least partially defining plenum 189 and plenum 191 to facilitate shroud segment impingement cooling in low pressure turbine section 114. Spent impingement cooling air 193 exits shroud segment 130 through cooling openings 194 defined at or near trailing edge 137 of shroud segment 130.

The shroud cooling assembly as shown in FIGS. 1 and 2 directs high pressure cooling air directly into high pressure turbine section active convection cooling zone 173 and/or low pressure turbine section active convection cooling zone 186 through respective feed hole(s) 174 and feed hole(s) 187.

In the shroud cooling assembly as shown in FIGS. 1 and 2, high pressure cooling air is not metered or directed through low pressure turbine section inactive convection cooling zone 211. As a result, the components defining low pressure turbine section inactive convection cooling zone 211 respond relatively slower to thermal conditions and/or environments during transient engine operation than the components defining an active convection cooling zone within conventional shroud cooling assemblies. This slower response to thermal conditions and/or environments facilitates relatively slower transient displacement of midsection position control ring 162 and/or aft position control ring 164.

Thus, by bypassing the low pressure turbine section shroud ring structure, the high pressure cooling air flow paths shown in FIGS. 1 and 2 facilitate reducing and/or retarding the transient thermal response and/or displacement of the shroud segment during transient engine operation. The slower response further facilitates improved blade tip clearance and turbine engine efficiency.

Figure 3:
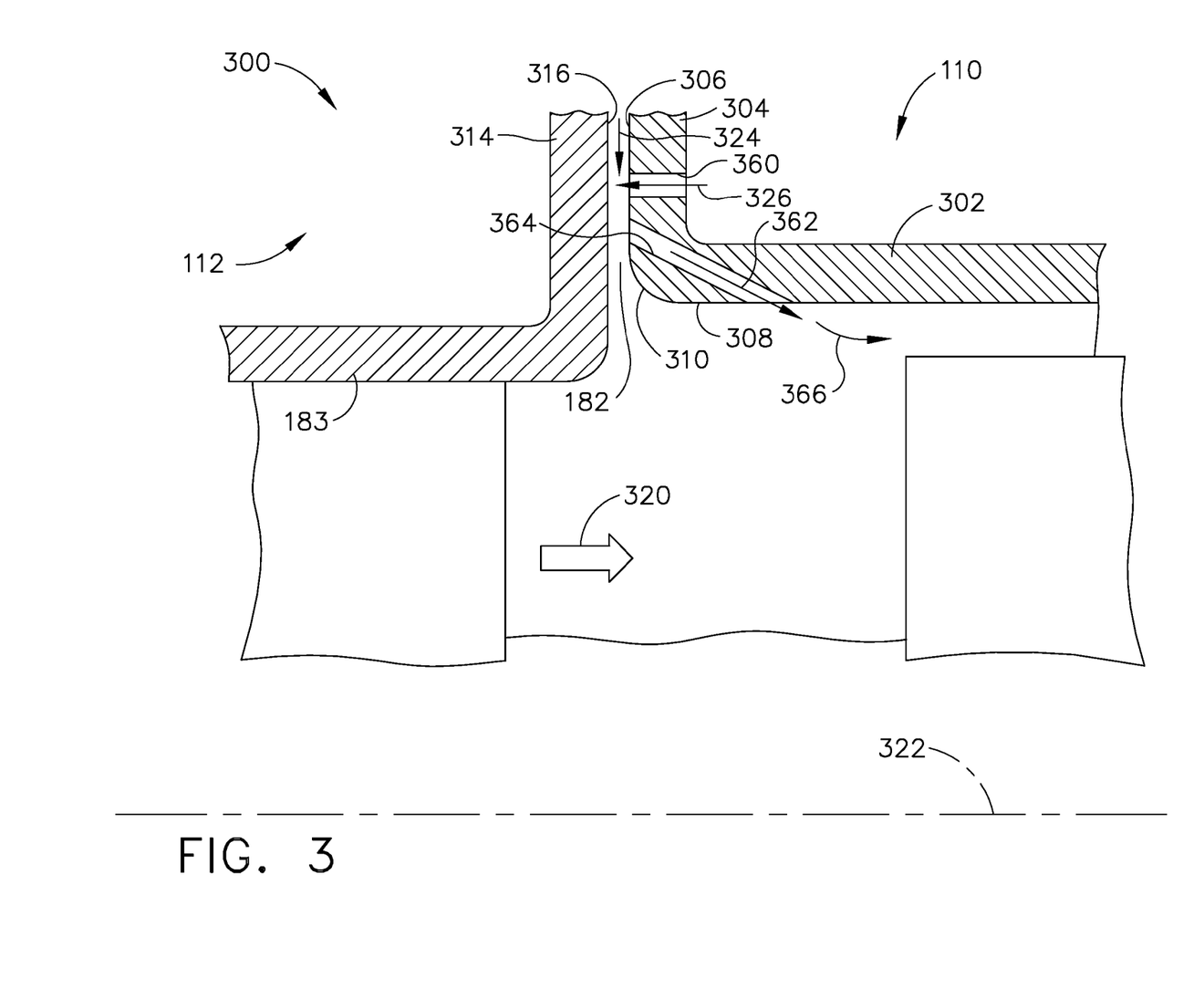
FIG. 3 is a schematic view of a portion of an exemplary turbine nozzle and shroud assembly.

FIG. 3 illustrates a portion of an exemplary turbine nozzle and shroud assembly 300 for use in a gas turbine engine. Shroud assembly 300 is similar to shroud assembly 110, and as such, components illustrated in FIG. 3 that are identical to components illustrated in FIGS. 1 and 2 are identified in FIG. 3 using the same reference number used in FIGS. 1 and 2. Gap 182 is defined at an interface between outer band 183 of an upstream turbine nozzle 112 and an immediately downstream and adjacent shroud assembly 110 that includes a shroud segment 302. In the exemplary embodiment, turbine nozzle 112 is coupled to shroud segment 302 to form turbine nozzle and shroud assembly 300.

A shroud segment leading edge 304 defines a forward face 306 of shroud segment 302. In the exemplary embodiment, a radially inner surface 308 of shroud segment 302 extends substantially perpendicularly to forward face 306. Moreover, in the exemplary embodiment, a rounded or arcuate corner portion 310 extends between forward face 306 and inner surface 308 and partially defines gap 182.

Outer band 183 has a trailing edge 314 that defines an aft face 316 of outer band 183. When turbine nozzle 112 is coupled to shroud segment 302, gap 182 is generally defined between aft face 316 and forward face 306. Gap 182 enables cooling air to flow radially inwardly towards a combustion gas or hot gas flow path 320. Hot gas flow path 320 flows generally parallel to a central axis 322 defined by the gas turbine engine. The cooling air may include leakage air 324 directed from duct 204, shown in FIG. 1, and/or shroud leading edge cooling air 326 discharged from active convection cooling zone 173, shown in FIG. 1.

In the exemplary embodiment, shroud segment leading edge 304 includes at least one forwardly directed cooling opening 360 that extends substantially perpendicularly therethrough. Moreover, in the exemplary embodiment, at least one discrete convection cooling hole 362 extends between forward face 306 and inner surface 308. Specifically, in the exemplary embodiment, convection cooling hole 362 extends obliquely through forward face 306 to inner surface 308 at a location that is radially inward from cooling opening 360.

37 During operation, cooling opening 360 meters a flow of shroud leading edge cooling air 326 into gap 182. Cooling air 326 is discharged from cooling opening 360 into gap 182, wherein the air 326 mixes with leakage air 324 discharged from duct 204, shown in FIG. 1. A portion of the mixed cooling air 364 is channeled through the at least one discrete convection cooling hole 362 to inner surface 308 to facilitate forming a recuperated film cooling layer 366 across inner surface 308. The remaining mixed cooling air 364 is discharged from gap 182 to facilitate film cooling of corner portion 310. Film cooling layer 366 facilitates forming a cooling barrier between hot gas flow path 320 and shroud segment 302. Moreover, cooling air 364 discharged from hole 362 provides energy to cooling layer 366 such that film cooling layer 366 is facilitated to be maintained in proximity to surface 308 for a longer distance across surface 308 prior to separating from surface 308. As a result, an operating temparture of shroud segment 302 is reduced such that a useful life of the turbine engine and/or shroud segment is facilitated to be increased.

Figure 4:
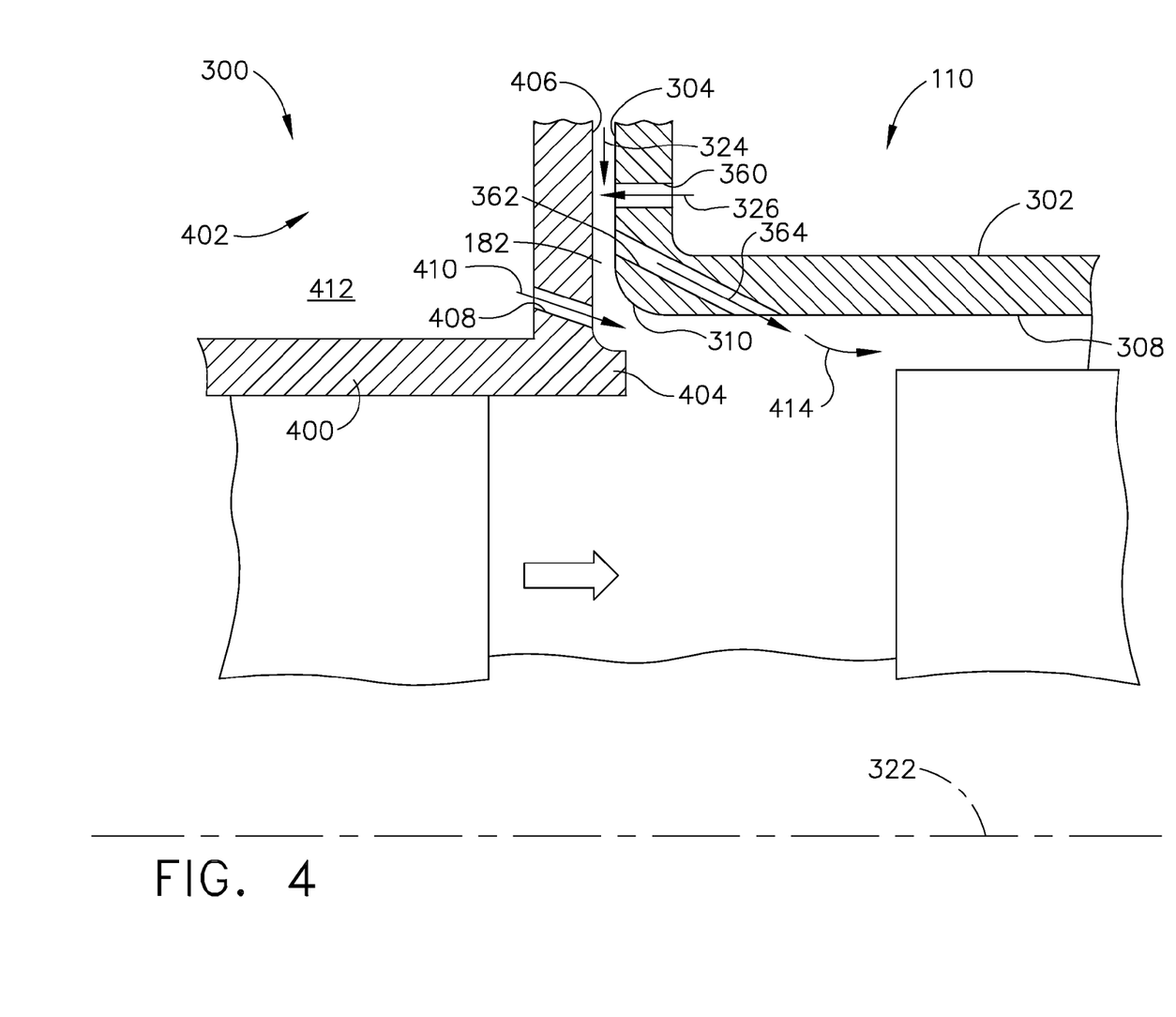
FIG. 4 is a schematic view of an alternative embodiment of a portion of a turbine nozzle and shroud assembly.

FIG. 4 illustrates an alternative embodiment of turbine nozzle and shroud assembly 300. The alternative embodiment illustrated in FIG. 4 is substantially similar to the embodiment shown in FIG. 3. As such, components illustrated in FIG. 4 that are identical to components illustrated in FIG. 3 are identified in FIG. 4 using the same reference number used in FIG. 3. Gap 182 is defined at an interface between an outer band 400 of an upstream turbine nozzle 402 and an immediately downstream and adjacent shroud assembly 110 that includes a shroud segment 302. In the exemplary embodiment, turbine nozzle 402 is coupled to shroud segment 302 to form turbine nozzle and shroud assembly 300 for a gas turbine engine. In the exemplary embodiment, a lip 404 is formed on an aft face 406 of turbine nozzle 402. More specifically, in the exemplary embodiment, lip 404 is positioned radially inwardly from gap 182 and corner portion 310, and extends downstream, generally parallel to central axis 322, from aft face 406.

In the exemplary embodiment, at least one discharge opening 408 is defined in aft face 406. Specifically, discharge opening 408 extends obliquely through aft face 406 and is radially outward from lip 404. Discharge opening 408 meters the flow of spent turbine nozzle cooling air 410 against lip 404. Specifically, spent turbine nozzle cooling air 410 is metered towards lip 404 from a turbine nozzle active convection cooling zone 412 that is at least partially defined by outer band 400.

During operation, spent turbine nozzle cooling air 410 is discharged from discharge opening 408 in a metered flow directed towards lip 404. Lip 404 re-directs cooling air 410 towards corner portion 310 and inner surface 308. Moreover, cooling air 364 is channeled through convection cooling hole 362 towards inner surface 308. Cooling air 364 and cooling air 410 mix adjacent inner surface 308 to facilitate forming a recuperated film cooling layer 414 across inner surface 308. Further, because lip 404 extends downstream from aft face 406, downstream from gap 182, lip 404 enables gap 182 to be pressurized to facilitate film cooling layer 414 being formed. Film cooling layer 414 facilitates forming a cooling barrier between hot gas flow path 320 and shroud segment 302, such that undesirable hot gas injection into gap 182 due to nozzle trailing edge wake effect is facilitated to be reduced. Moreover, film cooling layer 414 facilitates reducing an operating temperature of shroud segment 302, such that a useful life of the turbine engine and/or shroud assembly 110 is facilitated to be increased.

Referring to FIGS. 3 and 4, in the exemplary embodiments, cooling opening 360 extends through shroud segment leading edge 304 to meter a flow of shroud leading edge cooling air 326 into gap 182. Moreover, in the exemplary embodiments, cooling opening 360 is radially outward from convection cooling hole 362 such that shroud leading edge cooling air 326 discharged into gap 182 from cooling opening 360 is mixed with leakage air 324 directed from duct 204, shown in FIG. 1. A portion of the resulting mixed cooling air 364 is channeled through convection cooling hole 362 towards inner surface 308 to facilitate forming a recuperated film cooling layer 366 across inner surface 308. In one embodiment, lip 404 is positioned radially inward from at least one discharge opening 408, such that spent turbine nozzle cooling air 410 discharged from opening 408, is re-directed by lip 404 across corner portion 310 and towards inner surface 308. Mixed cooling air 364 discharged from discrete convection cooling hole 362, and cooling air 410 discharged from opening 408, are mixed adjacent surface 308 to facilitate forming a recuperated film cooling layer 414 across inner surface 308. Film cooling layers 366 and 414 facilitate forming a cooling barrier between hot gas flow path 320 shroud segment 302, such that undesirable hot gas injection into gap 182 due to nozzle trailing edge wake effect is facilitated to be reduced. Moreover, film cooling layers 366 and 414 facilitate reducing an operating temperature of shroud segment 302. As such, film cooling layers 366 and 414 facilitate increasing a useful life of the turbine engine and/or shroud assembly 110.

The above-described methods and systems facilitate film cooling a shroud segment. The methods and systems facilitate forming a barrier between the hot gas flow path flowing through the high pressure turbine and cooling air flowing through and exiting a gap defined between the turbine nozzle and the shroud segment. More specifically, cooling air flowing through the gap is directed through an opening extending through a leading edge of the shroud segment to facilitate forming a cooling layer on the shroud segment inner surface. In an alternative embodiment, spent turbine nozzle cooling air exiting the turbine nozzle outer band is directed to impinge against a lip extending from the trailing edge of the turbine nozzle. The lip is positioned radially inward from the gap and extends downstream from the gap to direct the cooling air towards a rounded corner portion formed on the leading edge of the shroud segment. The corner facilitates forming or developing a film cooling layer at, near, or adjacent to, the inner surface of the shroud segment downstream of the gap. Specifically, the film layer is formed from a combination of cooling air directed by the lip and corner portion and cooling air discharged from the opening that extends through the shroud segment leading edge. In one embodiment, the extended lip serves as a barrier between the hot gas flow path and the cooling air flowing through and exiting the gap defined between the outer band and the shroud segment. Further, the extended lip facilitates pressurizing the cooling air within the gap to substantially prevent or limit hot gas injection into the gap due to nozzle trailing edge wake effect as may be seen in conventional cooling systems or assemblies. Moreover, the film cooling layer facilitates reducing a temperature of the shroud segment, such that the film cooling layer facilitates increasing a life-span of the turbine engine and/or increasing an efficiency of the turbine engine.

In one embodiment, a method for cooling a shroud segment of a gas turbine engine is provided. The method includes providing a turbine shroud assembly including a shroud segment having an inner surface and a leading edge that is substantially perpendicular to the inner surface, and coupling a turbine nozzle to the turbine shroud segment such that a gap is defined between an aft edge of an outer band of the turbine nozzle and the leading edge. The method also includes directing cooling air into the gap, and directing the cooling air in the gap through at least one opening formed between the leading edge and the inner surface.

Exemplary embodiments of methods and systems for film cooling a shroud segment are described above in detail. The method and system are not limited to the specific embodiments described herein, but rather, steps of the method and/or components of the system may be utilized independently and separately from other steps and/or components described herein. Further, the described method steps and/or system components can also be defined in, or used in combination with, other methods and/or systems, and are not limited to practice with only the method and system as described herein.

While the invention has been described in terms of various specific embodiments, those skilled in the art will recognize that the invention can be practiced with modification within the spirit and scope of the claims.

What is claimed is:

1. A method for cooling a shroud segment of a gas turbine engine, said method comprising:
   providing a turbine shroud assembly including a shroud segment having an inner surface and a leading edge that is substantially perpendicular to the inner surface;
   coupling a turbine nozzle to the turbine shroud segment such that a gap is defined between an aft edge of an outer band of the turbine nozzle and the leading edge;
   metering a flow of cooling air into the gap through at least one forwardly directed cooling opening defined in the leading edge and positioned radially outward from the at least one cooling hole extending between the leading edge and the inner surface; and
   directing the cooling air in the gap through at least one cooling hole formed between the leading edge and the inner surface.

2. A method in accordance with claim 1 wherein directing the cooling air in the gap through at least one cooling hole formed between the leading edge and the inner surface further comprises directing the cooling air toward the inner surface to facilitate forming a recuperated film cooling layer across the inner surface.

3. A method in accordance with claim 1 wherein directing cooling air into the gap further comprises directing cooling air into the gap from a duct that is at least partially defined by the turbine nozzle and the turbine shroud segment.

4. A method in accordance with claim 1 wherein a lip is formed on the aft edge and extends downstream from the aft edge, said directing cooling air into the gap further comprises:
   metering spent turbine nozzle cooling air into the gap through at least one discharge opening extending through the aft edge; and
   directing the spent turbine nozzle cooling air in the gap against the lip and towards the shroud segment to facilitate cooling the shroud segment.

5. A method in accordance with claim 4 wherein the shroud segment includes a rounded corner portion extending between the leading edge and the inner surface, said method further comprises directing the spent turbine nozzle cooling air along the rounded corner portion to facilitate forming a film cooling layer across the inner surface.

6. A method in accordance with claim 1 further comprising pressurizing the gap to facilitate reducing a turbine nozzle wake effect within the gap.

7. A turbine nozzle and shroud assembly for a gas turbine engine, said turbine nozzle and shroud assembly comprising:
   a shroud segment comprising a leading edge and an inner surface that is substantially perpendicular to said leading edge; and
   a turbine nozzle comprising an outer band comprising an aft edge, said turbine nozzle is upstream from said shroud segment and is coupled with said shroud segment such that a gap is defined between said aft edge and said leading edge wherein said gap is pressurized to facilitate minimizing a turbine nozzle wake effect within said gap, said shroud segment comprises at least one cooling hole formed between said leading edge and said inner surface, said at least one cooling hole is configured to direct cooling air in said gap toward the hot gas flow path.

8. A turbine nozzle and shroud assembly in accordance with claim 7 wherein said at least one cooling hole is further configured to direct cooling air in the gap towards said inner surface to facilitate forming a recuperated film cooling layer across said inner surface.

9. A turbine nozzle and shroud assembly in accordance with claim 7 further comprising at least one forwardly directed cooling opening defined in said leading edge, said at least one forwardly directed cooling opening is radially outward from said at least one cooling hole formed between said leading edge and said inner surface and is configured to meter cooling air into said gap.

10. A turbine nozzle and shroud assembly in accordance with claim 7 further comprising a duct at least partially defined by said turbine nozzle and said turbine shroud segment, said duct configured to direct cooling air into said gap.

11. A turbine nozzle and shroud assembly in accordance with claim 7 further comprising:
    a lip formed on said aft edge, said lip extends downstream from said gap; and
    at least one discharge opening extending through said alt edge, said at least one discharge opening configured to meter spent turbine nozzle cooling air into said gap, such that said lip directs the spent turbine nozzle cooling air from said gap towards said shroud segment to facilitate cooling said shroud segment.

12. A turbine nozzle and shroud assembly in accordance with claim 11 further comprising a rounded corner portion extending between said leading edge and said inner surface, said rounded corner portion configured to direct the spent turbine nozzle cooling air towards said inner surface to facilitate forming a film cooling layer against said inner surface.

13. A cooling system for a gas turbine engine that includes a shroud segment having a leading edge and an inner surface that is substantially perpendicular to the leading edge, and a turbine nozzle that is upstream from the shroud segment and that includes an outer band having an aft edge, said cooling system comprising:
    at least one cooling hole formed between the leading edge and the inner surface, said cooling system is configured to direct cooling air from a gap defined between the aft edge and the leading edge towards a hot gas flow path defined within the gas turbine engine; and
    at least one forwardly directed cooling opening defined in the leading edge, said at least one forwardly directed cooling opening is radially outward from said at least one cooling hole extending between the leading edge and the inner surface, said at least one forwardly directed cooling opening is configured to meter cooling air into the gap.

14. A cooling system in accordance with claim 13 further configured to direct cooling air from the gap through said at least one cooling hole extending between the leading edge and the inner surface to facilitate forming a recuperated film cooling layer across the inner surface of the shroud segment.

15. A cooling system in accordance with claim 13 further comprising a duct at least partially defined by the turbine nozzle and the turbine shroud segment, said duct configured to direct cooling air into the gap.

16. A cooling system in accordance with claim 13 further comprising:
    a lip formed on the outer band aft edge, said lip extends downstream from the gap; and
    at least one discharge opening extending through the aft edge, said at least one discharge opening is configured to meter spent turbine nozzle cooling air into the gap, said lip is configured to direct the spent turbine nozzle cooling air from to facilitate film cooling the shroud segment.

17. A cooling system in accordance with claim 16 further comprising a rounded corner portion extends between the leading edge and the inner surface, said rounded corner portions configured to direct spent turbine nozzle cooling air towards the inner surface of the shroud segment to facilitate forming a film cooling layer across the inner surface.

\* \* \* \* \*